(12) United States Patent
Janikowski et al.

(10) Patent No.: US 8,231,752 B2
(45) Date of Patent: Jul. 31, 2012

(54) METHOD AND APPARATUS FOR MAKING FILTER ELEMENT, INCLUDING MULTI-CHARACTERISTIC FILTER ELEMENT

(75) Inventors: Eric A. Janikowski, Jefferson, WI (US); Barry M. Verdegan, Stoughton, WI (US); Jerald J. Moy, Oregon, WI (US); Jacek Bodasiński, Warsaw (PL); Witalis Rumiński, Warsaw (PL); Leon Gradoń, Warsaw (PL); Tadeusz Jaroszczyk, Stoughton, WI (US); Robert E. Muse, Cookeville, TN (US); Melvin Rice, Brentwood, TN (US)

(73) Assignees: Cummins Filtration IP Inc., Minneapolis, MN (US); Microspun Products Ltd., Warszawa (PL)

( * ) Notice: Subject to any disclaimer, the term of this patent is extended or adjusted under 35 U.S.C. 154(b) by 185 days.

(21) Appl. No.: 11/442,943

(22) Filed: May 30, 2006

(65) Prior Publication Data

US 2007/0131235 A1 Jun. 14, 2007

Related U.S. Application Data

(63) Continuation-in-part of application No. 11/273,101, filed on Nov. 14, 2005, now Pat. No. 7,674,425.

(51) Int. Cl.
*B29C 53/56* (2006.01)
*B29C 53/80* (2006.01)
(52) U.S. Cl. .................... 156/167; 156/175
(58) Field of Classification Search .............. 156/167, 156/169, 173, 175
See application file for complete search history.

(56) References Cited

U.S. PATENT DOCUMENTS

| | | | |
|---|---|---|---|
| 3,645,398 A | | 2/1972 | Fiocco |
| 3,755,527 A | | 8/1973 | Keller |
| 3,801,400 A | * | 4/1974 | Vogt et al. ............. 156/167 |
| 3,841,953 A | | 10/1974 | Lohkamp et al. |
| 3,870,640 A | | 3/1975 | Reece |
| 3,904,798 A | | 9/1975 | Vogt et al. |
| 3,933,557 A | * | 1/1976 | Pall ........................ 156/167 |
| 3,938,973 A | | 2/1976 | Kershaw |
| 3,949,130 A | | 4/1976 | Sabee et al. |
| 3,971,373 A | | 7/1976 | Braun |
| 3,972,759 A | | 8/1976 | Buntin |
| 3,978,185 A | | 8/1976 | Buntin et al. |
| 4,048,364 A | | 9/1977 | Harding et al. |
| 4,078,124 A | | 3/1978 | Prentice |
| 4,116,738 A | | 9/1978 | Pall |
| 4,192,919 A | | 3/1980 | Raghavachari |

(Continued)

FOREIGN PATENT DOCUMENTS

EP 0325854 4/1993

(Continued)

OTHER PUBLICATIONS

S. F. Moses and K. M. Ng, "*A Visual Study of the Breakdown of Emulsions in Porous Coalescers*", Chemical Engineering Science, vol. 40, No. 12; pp. 2339-2350, 1985.

(Continued)

*Primary Examiner* — Michael Tolin
(74) *Attorney, Agent, or Firm* — Andrus, Sceales, Starke & Sawall, LLP

(57) ABSTRACT

Method and apparatus are provided for making a filter element by spinning fibers from one or more dies onto a collector, including designated combinations providing designated filter characteristics.

59 Claims, 7 Drawing Sheets

U.S. PATENT DOCUMENTS

| | | |
|---|---|---|
| 4,253,954 A | 3/1981 | Midkiff et al. |
| 4,282,097 A | 8/1981 | Kuepper et al. |
| 4,416,782 A | 11/1983 | Kerres |
| 4,524,000 A | 6/1985 | Clayfield et al. |
| 4,594,202 A * | 6/1986 | Pall et al. ............. 264/8 |
| 4,668,393 A | 5/1987 | Stone |
| 4,689,058 A | 8/1987 | Vogt et al. |
| 4,726,901 A | 2/1988 | Pall et al. |
| 4,859,348 A | 8/1989 | Jusaitis et al. |
| 4,859,349 A | 8/1989 | Clark et al. |
| 4,874,399 A | 10/1989 | Reed et al. |
| 4,878,929 A | 11/1989 | Tofsland et al. |
| 4,892,667 A | 1/1990 | Parker, III et al. |
| 4,995,974 A | 2/1991 | Lorey et al. |
| 5,061,170 A | 10/1991 | Allen et al. |
| 5,075,068 A | 12/1991 | Milligan et al. |
| 5,122,048 A | 6/1992 | Deeds |
| 5,145,689 A | 9/1992 | Allen et al. |
| 5,174,907 A | 12/1992 | Chown et al. |
| 5,227,172 A | 7/1993 | Deeds |
| 5,236,641 A | 8/1993 | Allen et al. |
| 5,254,297 A | 10/1993 | Deeds |
| 5,269,670 A | 12/1993 | Allen et al. |
| 5,273,565 A | 12/1993 | Milligan et al. |
| 5,296,061 A | 3/1994 | Ando et al. |
| 5,306,321 A | 4/1994 | Osendorf |
| 5,340,479 A | 8/1994 | Szczepanski et al. |
| 5,401,458 A | 3/1995 | Wadsworth et al. |
| 5,409,642 A | 4/1995 | Allen et al. |
| 5,411,576 A | 5/1995 | Jones et al. |
| 5,419,953 A | 5/1995 | Chapman |
| 5,427,597 A | 6/1995 | Osendorf |
| 5,454,848 A | 10/1995 | Miller |
| 5,470,663 A | 11/1995 | Wadsworth et al. |
| 5,472,481 A | 12/1995 | Jones et al. |
| 5,480,547 A | 1/1996 | Williamson et al. |
| 5,501,872 A | 3/1996 | Allen et al. |
| 5,591,335 A | 1/1997 | Barboza et al. |
| 5,605,706 A | 2/1997 | Allen et al. |
| 5,618,566 A | 4/1997 | Allen et al. |
| 5,667,562 A | 9/1997 | Midkiff |
| 5,672,232 A | 9/1997 | Clack |
| 5,681,469 A | 10/1997 | Barboza et al. |
| 5,733,581 A | 3/1998 | Barboza et al. |
| 5,750,024 A | 5/1998 | Spearman |
| 5,800,706 A | 9/1998 | Fischer |
| 5,913,851 A | 6/1999 | Gryskiewicz et al. |
| 5,916,678 A | 6/1999 | Jackson et al. |
| 5,972,063 A | 10/1999 | Dudrey et al. |
| 5,994,482 A | 11/1999 | Georgellis et al. |
| 6,019,809 A | 2/2000 | Kahlbaugh et al. |
| 6,093,231 A | 7/2000 | Read et al. |
| 6,114,017 A | 9/2000 | Fabbricante et al. |
| 6,117,322 A | 9/2000 | Miller et al. |
| 6,136,076 A | 10/2000 | Read |
| 6,146,580 A | 11/2000 | Bontaites, Jr. |
| 6,171,369 B1 | 1/2001 | Schultink et al. |
| 6,179,890 B1 | 1/2001 | Ramos et al. |
| 6,315,805 B1 | 11/2001 | Strauss |
| 6,342,283 B1 | 1/2002 | Mozelack et al. |
| 6,358,417 B1 | 3/2002 | Aune et al. |
| 6,387,141 B1 | 5/2002 | Hollingsworth et al. |
| 6,387,144 B1 | 5/2002 | Jaroszczyk et al. |
| 6,402,951 B1 | 6/2002 | Wilson et al. |
| 6,413,344 B2 | 7/2002 | Bodaghi |
| 6,422,396 B1 | 7/2002 | Li et al. |
| 6,423,227 B1 | 7/2002 | Allen et al. |
| 6,432,175 B1 | 8/2002 | Jones et al. |
| 6,485,535 B1 | 11/2002 | Linnersten et al. |
| 6,488,801 B1 | 12/2002 | Bodaghi et al. |
| 6,521,555 B1 | 2/2003 | Bodaghi et al. |
| 6,544,310 B2 | 4/2003 | Badeau et al. |
| 6,585,790 B2 | 7/2003 | Linnersten et al. |
| 6,613,268 B2 | 9/2003 | Haynes et al. |
| 6,662,842 B2 | 12/2003 | Mozelack et al. |
| 6,736,274 B2 | 5/2004 | Tremblay et al. |
| 6,797,025 B2 | 9/2004 | Linnersten et al. |
| 6,811,588 B2 | 11/2004 | Niakin |
| 6,838,402 B2 | 1/2005 | Harris et al. |
| 6,860,917 B2 | 3/2005 | Henrichsen et al. |
| 6,872,431 B2 | 3/2005 | Kahlbaugh et al. |
| 6,916,353 B2 | 7/2005 | Tang |
| 6,916,395 B2 | 7/2005 | Aune et al. |
| 6,932,923 B2 | 8/2005 | Nguyen |
| 6,938,781 B2 | 9/2005 | Aune et al. |
| 6,989,193 B2 | 1/2006 | Haile et al. |
| 7,309,372 B2 | 12/2007 | Kahlbaugh et al. |
| 2002/0046656 A1 | 4/2002 | Benson et al. |
| 2002/0070471 A1 | 6/2002 | Lee |
| 2002/0073667 A1 | 6/2002 | Barris et al. |
| 2002/0092423 A1 | 7/2002 | Gillingham et al. |
| 2002/0187701 A1 | 12/2002 | Healey |
| 2003/0010002 A1 | 1/2003 | Johnson et al. |
| 2003/0080464 A1* | 5/2003 | Aune et al. ............. 264/211.14 |
| 2003/0116874 A1* | 6/2003 | Haynes ............. 264/40.3 |
| 2003/0203696 A1 | 10/2003 | Healey |
| 2005/0082238 A1 | 4/2005 | Larson |
| 2006/0278574 A1* | 12/2006 | Khan et al. ............. 210/483 |
| 2007/0039300 A1 | 2/2007 | Kahlbaugh et al. |

FOREIGN PATENT DOCUMENTS

| | | |
|---|---|---|
| EP | 0428400 | 6/1995 |
| EP | 0682557 | 4/1997 |
| EP | 0616831 | 6/1999 |
| EP | 0960645 | 2/2000 |
| EP | 1270771 | 1/2003 |
| EP | 1198280 | 6/2003 |
| EP | 1173269 | 7/2003 |
| EP | 1050331 | 12/2003 |
| EP | 1133342 | 1/2004 |
| EP | 01048335 | 4/2005 |
| GB | 02015253 | 9/1979 |
| GB | 02194255 | 3/1988 |
| JP | 11-036169 | 2/1999 |
| PL | 172113 | 4/1995 |
| PL | 186112 | 9/1999 |
| WO | WO-95/13856 | 5/1995 |
| WO | WO-97/39817 | 10/1997 |
| WO | WO-00/29656 | 5/2000 |
| WO | WO-01/42549 | 6/2001 |
| WO | WO-02/20133 | 3/2002 |
| WO | WO-02/20668 | 3/2002 |
| WO | WO-2004/100592 | 12/2004 |

OTHER PUBLICATIONS

Tadeusz Jaroszczyk et al., "*Chapter 10 Cartridge Filtration*", in Filtration Principles and Practices, Second Edition, Revised and Expanded, Michael Matteson and Clyde Orr, eds., Marcel Dekker, Inc., New York, 1987, p. 547.

L. Spielman et al., "*Progress in Induced Coalescence and a New theoretical Framework for Coalescence by Porous Media*", Flow through Porous Media, R. Nunge, Chairman, ACS Publications, Washington, D.C., 1970.

L. Spielman et al., "*Theory of Coalescence by Flow through Porous Media*", Ind. Eng. Chem. Fundamentals, 11:66-72, 1972a.

L. Spielman et al., "Experiments in Coalescence by Flow through Fibrous Mats", Ind. Eng. Chem. Fundamentals, 11:73-83, 1972b.

L. Spielman et al., "*Coalescence in Oil-in-Water Suspensions by Flow Through Porous Media*", Ind. Eng. Chem. Fundamentals, 16:272-282, 1977.

* cited by examiner

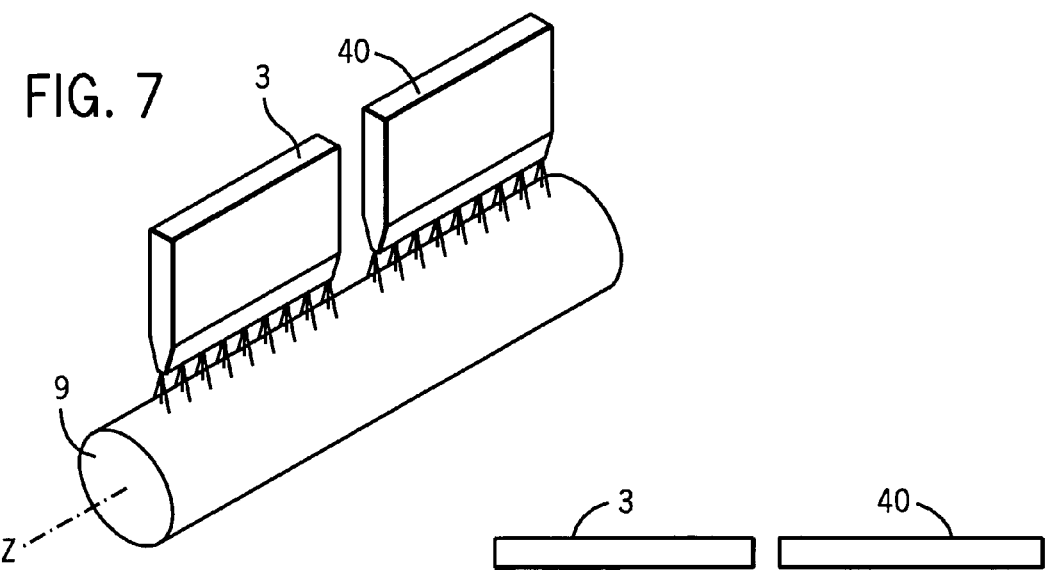
FIG. 7
FIG. 8
FIG. 9
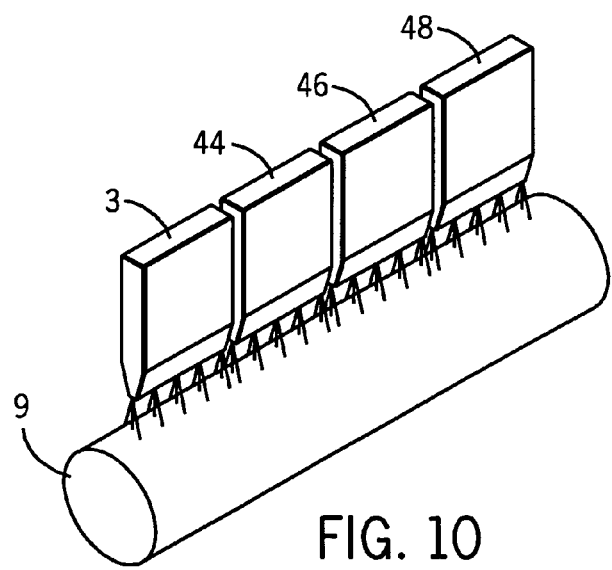
FIG. 10

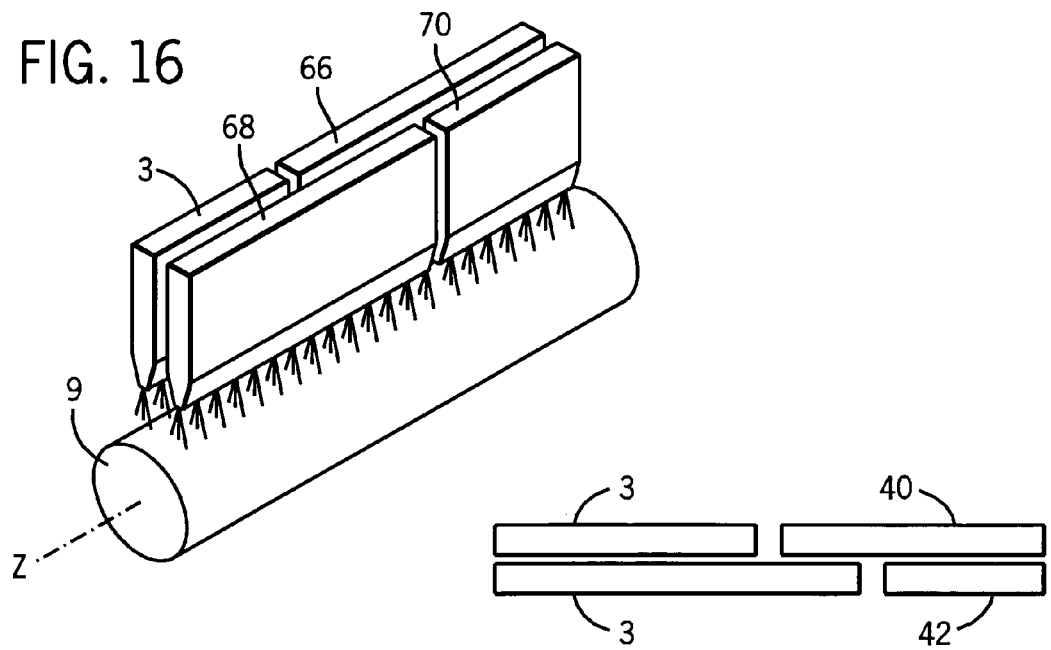
FIG. 16
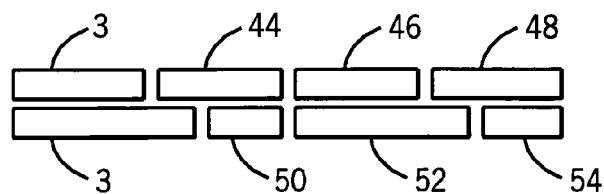
FIG. 17
FIG. 18
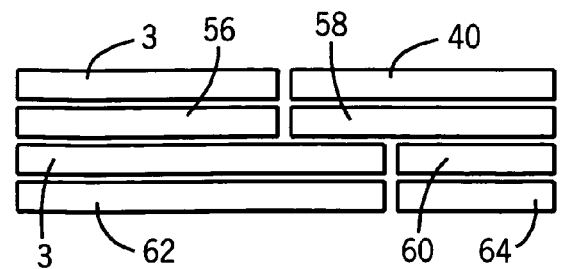
FIG. 19

METHOD AND APPARATUS FOR MAKING FILTER ELEMENT, INCLUDING MULTI-CHARACTERISTIC FILTER ELEMENT

CROSS-REFERENCE TO RELATED APPLICATION

This application is a continuation-in-part of U.S. patent application Ser. No. 11/273,101, filed Nov. 14, 2005, now U.S. Pat. No. 7,674,425.

BACKGROUND AND SUMMARY

The invention relates to filter elements and methods and apparatus for making same.

The invention arose during continuing development efforts directed toward coalescers as in the noted parent application, and to various other types of filters, including particulate filters, and including engine crankcase ventilation filter element cartridges. The invention includes method and apparatus for making filter elements having multiple filter characteristics.

BRIEF DESCRIPTION OF THE DRAWINGS

Parent Application

FIG. 1 is a schematic perspective view illustrating a method for making a coalescer in accordance with the parent application.
FIG. 2 is like FIG. 1 and shows a further embodiment.
FIG. 3 is a graph illustrating coalescer characteristics in accordance with the parent application.

Present Application

Figure 5:
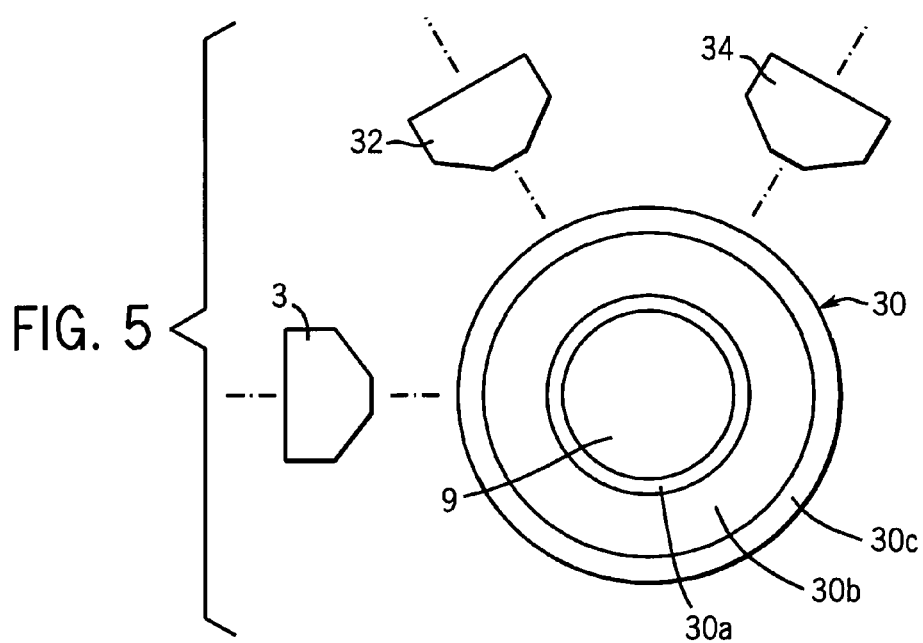
Figure 4:
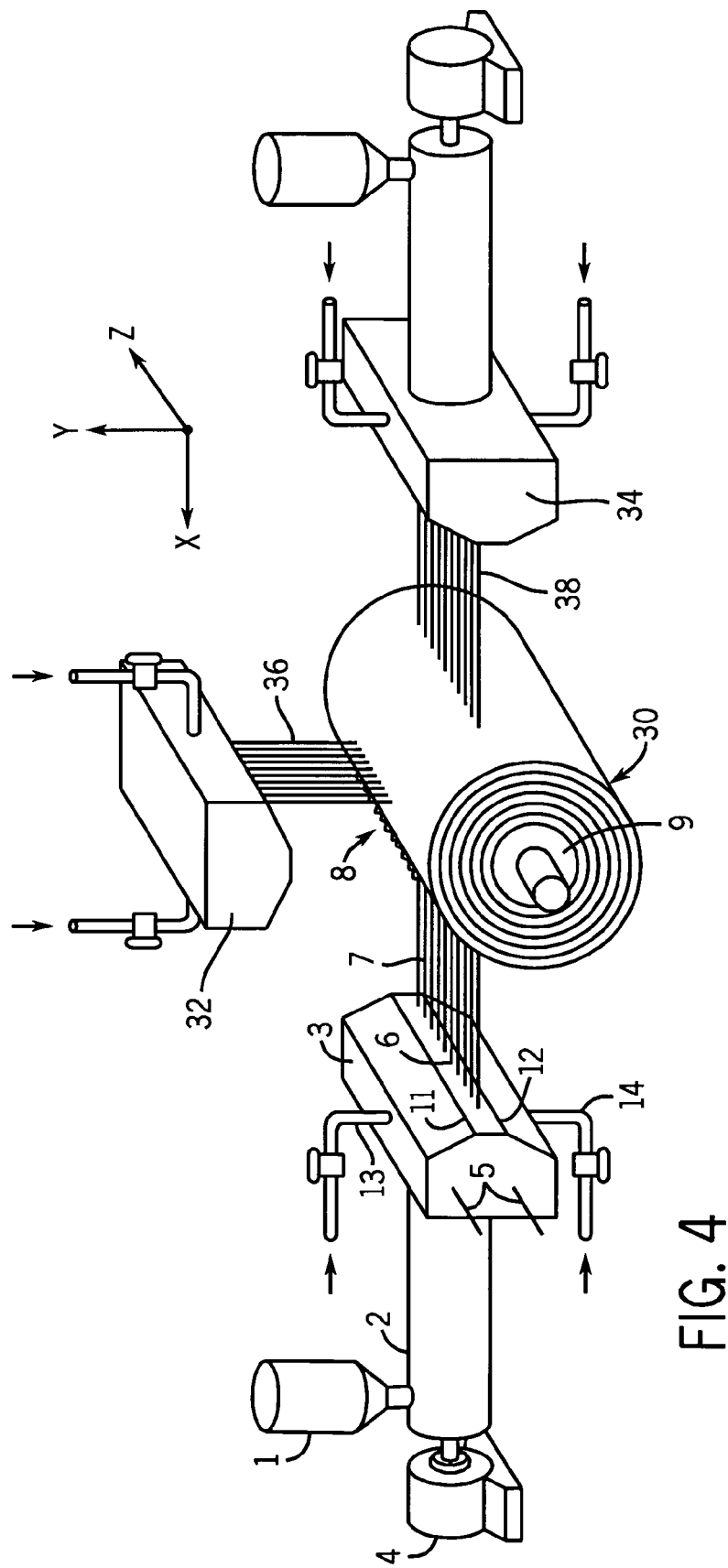
Figure 6:
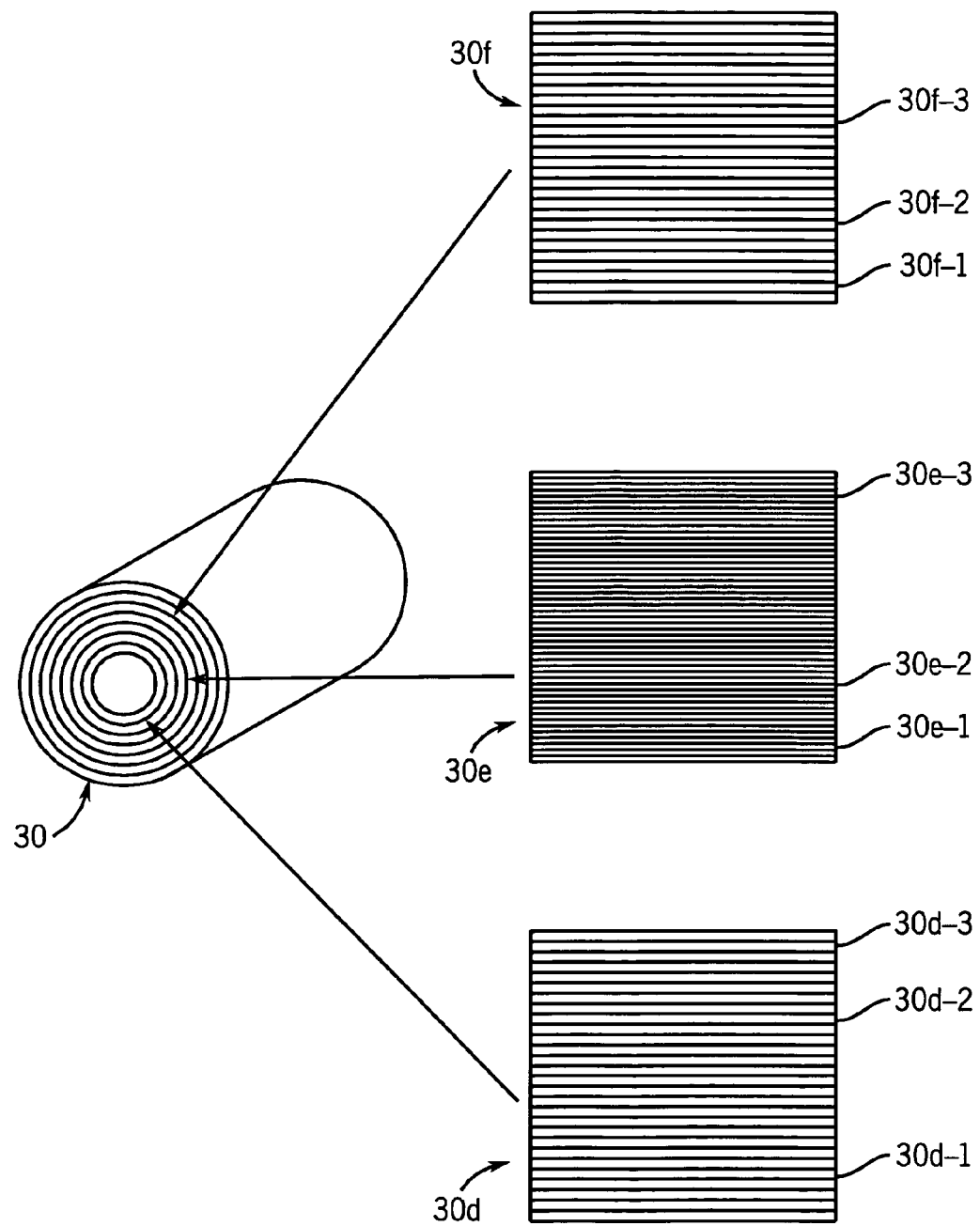
Figure 11:
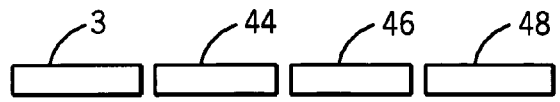
Figure 12:
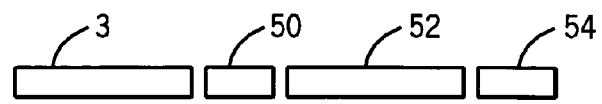
Figure 13:
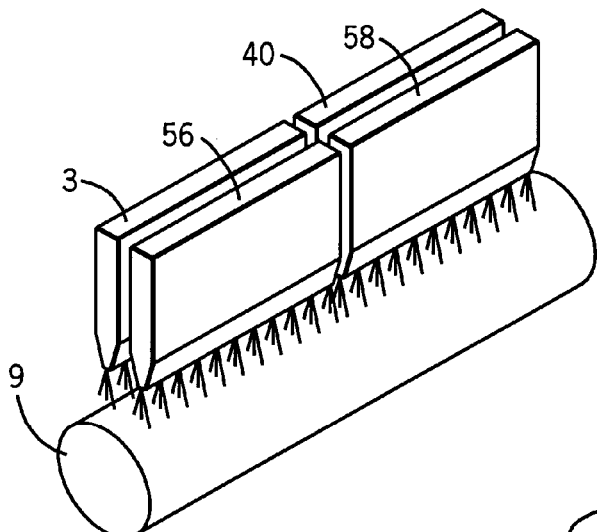
Figure 14:
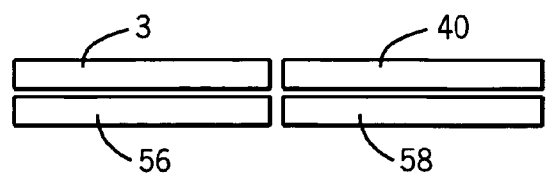
Figure 15:
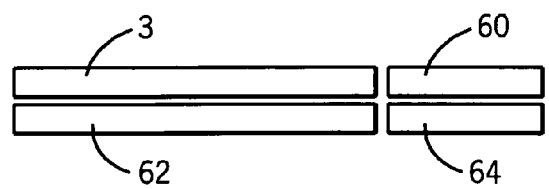

FIG. 4 is a schematic perspective view illustrating the invention.
FIG. 5 is a side view of the system of FIG. 4 and illustrating a further embodiment.
FIG. 6 is a perspective view of a portion of FIG. 4.
FIG. 7 is like FIG. 4 and shows a further embodiment.
FIG. 8 is a top plan view of the system of FIG. 7.
FIG. 9 is like FIG. 8 and shows another embodiment.
FIG. 10 is like FIG. 7 and shows another embodiment.
FIG. 11 is a top plan view of the system of FIG. 10.
FIG. 12 is like FIG. 11 and shows another embodiment.
FIG. 13 is like FIG. 7 and shows another embodiment.
FIG. 14 is a top plan view of the system of FIG. 13.
FIG. 15 is like FIG. 14 and shows another embodiment.
FIG. 16 is like FIG. 7 and shows another embodiment.
FIG. 17 is a top plan view of the system of FIG. 16.
FIG. 18 is like FIG. 17 and shows another embodiment.
FIG. 19 is like FIG. 17 and shows another embodiment.

DETAILED DESCRIPTION

Parent Application

Figure 1:
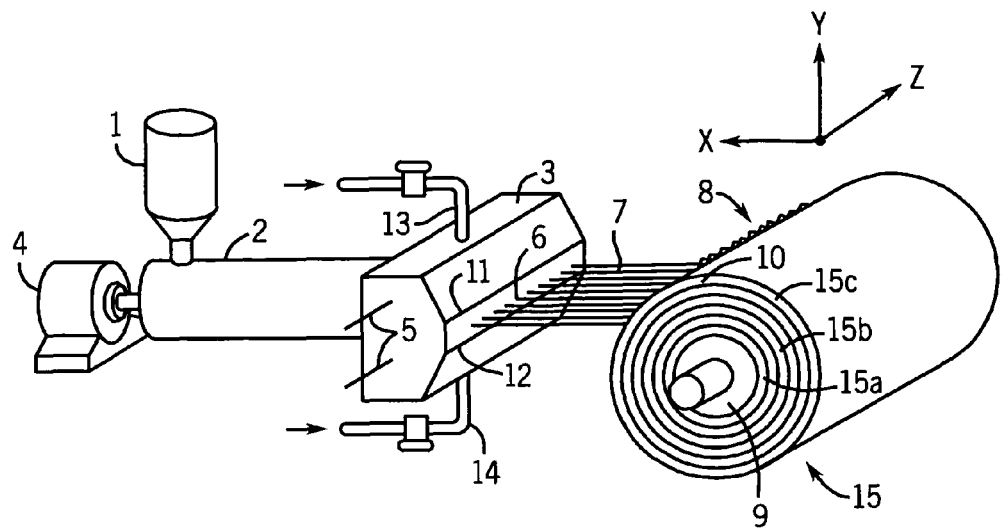
FIGS. 1-3 are taken from the noted parent application.

In the preferred embodiment, the parent application uses melt blowing techniques for making a coalescer in accordance with the parent application. Melt blowing techniques for particulate filters are known in the prior art, for example U.S. Pat. Nos. 6,860,917, 3,755,527, incorporated herein by reference. Referring to FIG. 1, and also noting the description in incorporated U.S. Pat. No. 6,860,917, Col. 3, lines 25+, pellets of thermoplastic polymer, for example polyester, polypropylene, polyetherester, polyamide, polyurethane, polyphenylene sulfide, nylon, ethylene acrylic copolymer, polystyrene, polymethylmethacrylate, polycarbonate, silicones, polyethyleneter-phthalate, or blends or mixtures of these, are introduced into a pellet hopper 1 of an extruder 2. The thermoplastic polymer is forced into a die head 3 by the extruder 2 which is driven by drive 4. The die head 3 may contain heating means 5 which may control the temperature in the die head 3. The thermoplastic polymer is then forced out of a row of die openings 6, also known as spinnerets, in the die head 3 into a gas stream which attenuates the thermoplastic polymer into fibers 7 which are collected on a moving collecting device 8 such as a rotating mandrel or drum 9 to form a continuous web 10. The gas stream which attenuates the thermoplastic polymer is supplied through gas jets 11 and 12, for which further reference may be had to FIG. 2 of above noted incorporated U.S. Pat. No. 3,755,527. The gas slots 11 and 12 are supplied with a hot gas, preferably air, by gas lines 13 and 14. Reference is also made to U.S. Pat. No. 3,978,185, incorporated herein by reference, for showing a melt blowing process. Typically, melt blown filter cartridges are made by extruding a polymer through orifices associated with a melt blowing die to form fibers which are directed toward a collector. During melt blowing, a flow of inert gas (e.g. air) acts on the molten fibers so as to attenuate the fibers to relatively fine diameter and to randomly distribute the attenuated fibers onto the collector. A mass of non-woven, randomly intermingled solidified fibers builds up on the collector. Collector 8 provided by rotary mandrel 9 collects and rolls the fibers into an annular filter roll 15.

In one aspect, the parent application provides a method for producing essentially continuous, long fibers of polymer with varying diameter by a melt blown process. The fibers are wound into a form of defined shape to produce the coalescer element with graded fiber diameter and porosity characteristics. The coalescer coalesces a medium having two immiscible phases, namely a continuous phase and a dispersed phase. The continuous phase flows from upstream to downstream. The coalescer element is provided by fibrous media capturing droplets of the dispersed phase, coaslescingly growing the droplets into larger drops which further coalesce and grow to form pools that drain. In one preferred embodiment, it is desirable for the coalescer media properties to vary as a function of depth. In coalescer applications such as crankcase ventilation coalescers, mist removal filters, fuel water coalescers, and oil water separators, it is desirable in one preferred embodiment for porosity and/or fiber diameter to decrease with increasing distance into the media, reaching a minimum at mid depth, i.e. somewhere between the upstream and downstream ends, and then for the porosity and/or fiber diameter to increase and become more open with further increasing distance into the media from mid depth to downstream, approaching the downstream face. This U-shaped profile is further described hereinafter, e.g. FIG. 3, providing decreasing fiber diameter and/or porosity from upstream to mid depth, and then increasing fiber diameter and/or porosity from mid depth to downstream. The decreasing porosity and fiber diameter results in lower restriction in the upstream portions of the coalescer. The minimum fiber diameter and/or porosity is where maximum removal efficiency is obtained. The subsequent increase in porosity and fiber diameter, proceeding from mid depth to downstream, facilitates drainage and release of captured droplets from the coalescer.

A variety of methods have been used to vary coalescer media properties as a function of depth. For example, different media layers can be stacked to obtain such effect. Coalescing filters, for example, are constructed of an inner, high efficiency coalescing layer, and an outer, coarser drainage layer. In some applications, multiple layers, e.g. perhaps as many as seven distinct layers, are used to achieve the noted benefits. Typically, this may be done by rolling or pleating different media sheets together in layers or by melt blowing, including melt spinning, different layers on top of one another. Each layer may consist of a different material to be obtained and handled in production. Each layer may require a different step and/or piece of equipment for handling and production. Transitions between layers tend to be abrupt or exhibit a step function change, which can result in corresponding discontinuities in fluid flow and may result in increased restriction and reduced life and capacity.

In one aspect of the parent application, a method is provided for producing coalescer elements, including for crankcase ventilation and mist removal coalescers, and for other types of coalescers using fibrous coalescer media in which it may be desirable to vary fiber diameter and/or porosity as a function of depth into the coalescer. Fibers are created of essentially continuous length by melt blowing from a suitable thermoplastic polymer, for example those noted above. The fibers are collected onto a turning/spinning/rotating mandrel or other suitable collector of suitable cross-sectional shape, e.g. circular, oval, elliptical, racetrack, triangular, rectangular, diamond, trapezoidal, star-shaped and so on. In one aspect, the diameter of the individual fibers is varied as they are produced to create long fibers that have different diameters at different points along their length. In a further aspect, the diameter of the fibers is controlled as they are produced relative to the thickness of the coalescer media being formed on the mandrel in order to create a coalescer element with coalescer media properties, e.g. fiber diameter and/or porosity that vary as a function of depth. In another aspect, the collector, or mandrel, and the melt blowing die are moved relative to one another in a one, two or three dimensional manner.

FIG. 1 schematically illustrates the noted method. It shows a melt blowing process, including the noted hopper 1 containing the polymer pellets, the melt pump 4, the air lines 13, 14, the die 3, the mandrel 9, the fibers 7, and the formed coalescer element 15. Also illustrated is a three dimensional coordinate system having X, Y and Z axes orthogonal to each other, wherein the collector 8 provided by rotating mandrel 9 rotates about the Z axis and is spaced from die 3 along the X axis. The length of die 3 along the Z axis is typically less than that of element 15 in order to allow relative movement of die 3 and collector mandrel 9 during production of element 15 without significant overspray of the fiber 7. Fiber diameter along the length of the fiber is varied during production of the fiber by: varying the distance between the die and the collector/mandrel by moving the die and collector/mandrel relative to one another in the X and/or Y directions; and/or controlling the relative position of the die and the collector/mandrel to one another in the X, Y and Z directions; and/or controlling polymer throughput; and/or controlling air pressure and/or flow rate; and/or controlling mandrel speed, e.g. by moving the die and collector mandrel relative to one another in X, Y and/or Z directions and/or controlling mandrel rotation speed about the Z axis; and/or temperature of the polymer. These factors also affect the porosity and fiber orientation of the coalescer media. For example, by moving the relative positions of the die and collector back and forth in the Z direction, the orientation of fibers is reversed upon such change in direction of the collector or die. This creates a crossed pattern of interlocking fibers that increases the structural integrity of the resultant element, and facilitates drainage of coalesced liquid, for example as set forth in commonly owned copending U.S. patent application Ser. No. 11/230,694, filed Sep. 20, 2005, incorporated herein by reference.

Figure 2:
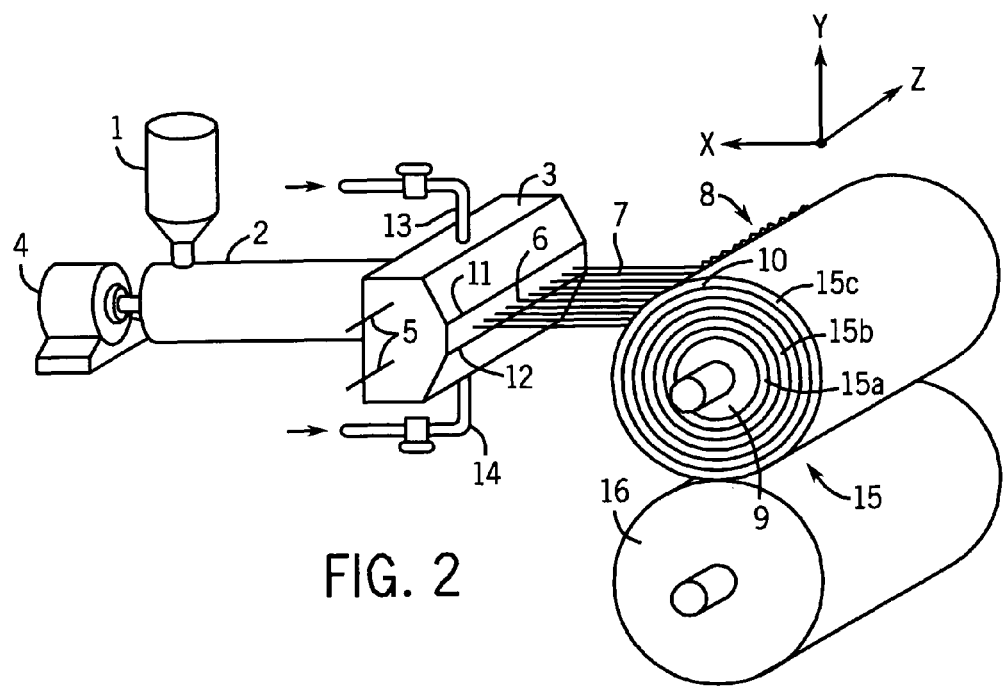

Porosity can also be controlled by applying pressure to the media. FIG. 2 is like FIG. 1 and uses like reference numerals from above where appropriate to facilitate understanding. A method of controlling porosity is provided through the use of a compression roller 16. By controlled use of compression roller 16 to apply pressure on coalescer element 15 and by controlling the pressure/force with which compression roller 16 rolls against element 15, porosity can be controlled during element production. Fiber diameter and/or porosity is controlled as a function of depth without using different layers of different media providing composite or laminate structures.

Fiber diameter is also a function of the types of thermoplastic polymer introduced into the hopper. This can be used to advantage to create higher performance coalescer elements. For example, by mixing pellets of two or more different types of compatible polymers, for example two polyesters with different melting points, in the hopper, and melt blowing the resultant mixture, fibers of two or more different diameters, chemical and physical characteristics can be simultaneously melt blown and laid down at the same location with respect to depth in the element. If for example, the two polymers have different melting points, one will cool faster than the other, and the one with the lowest melting point will bond strongly to the other type and increase the overall strength and structural integrity of the media, while creating a bi-modal fiber diameter distribution, with the fiber diameter of each mode varied during fiber production. Similarly, restriction and removal, for example, can be optimized by blending a small percentage of a polymer that yields large diameter fibers with a higher percentage of a polymer that yields finer fibers. Alternatively, the structural integrity of the element, for example, can be increased by blending a small percentage of a polymer that yields large diameter strong fibers with a higher percentage of a polymer that yields finer fibers better suited to capture fine contaminants but lacking in structural integrity. Drainage of coalesced liquid from a coalescer and reduced restriction may be obtained by blending a relatively highly wetting polymer with a relatively non-wetting polymer. To further optimize coalescer media structure, one could vary the relative amounts of the different types of fibers as a function of depth by controlling the relative amounts of the different polymers in the hopper or being pumped to the die. The combinations produce elements particularly well suited for coalescer applications, including crankcase ventilation filters, mist removal filters, fuel water coalescers, and oil water separators. Such elements coalesce and remove contaminant droplets from the fluid stream. They achieve high removal efficiency, to facilitate drainage of coalesced liquid contaminant, to have high contaminant holding capacity and long service life.

As an example, in a first coalescer embodiment, fibers having at least a bi-modal fiber diameter distribution are wound in a roll as a single sheet but effectively providing multiple layers in an element roll 15 achieving a porosity which varies as a function of depth. The average diameter for the smaller fibers in the fiber distribution is in the range of 0.05 to 10 µm (microns), depending on the efficiency requirements. The function of these fibers is to remove fine contaminant with high efficiency. The coarser fibers have diameters from 20 to 100 µm to facilitate drainage. These elements are made as depth type elements with a minimum thickness of 10 mm. In order to make the elements physically robust and simultaneously generate fibers of two different diameters, two different types of polymers are used, e.g. 95% PBT (polybutyleneterephthalate) polymer and 5% PET (polyethyleneterephthalate) polymer is used. The average fiber density is 1.38 grams per cubic meter, and the average element porosity is greater than 80%. The use in combination of fine and coarse fibers, i.e. an individual fiber with differing diameters at different points along its length, results in high efficiency, good drainage properties, and low droplet re-entrainment. The removal efficiency for a new element is greater than 90% for ultra fine oil mist and soot while testing on a diesel engine in application to crankcase ventilation. The droplet size of oil mist ranges from less than 0.03 μm to 10 μm, while an average diameter is in the range of 0.4 to 1.0 μm. An efficiency of greater than 80% is obtained, even for the oil saturated stage of the coalescing process.

Figure 3:
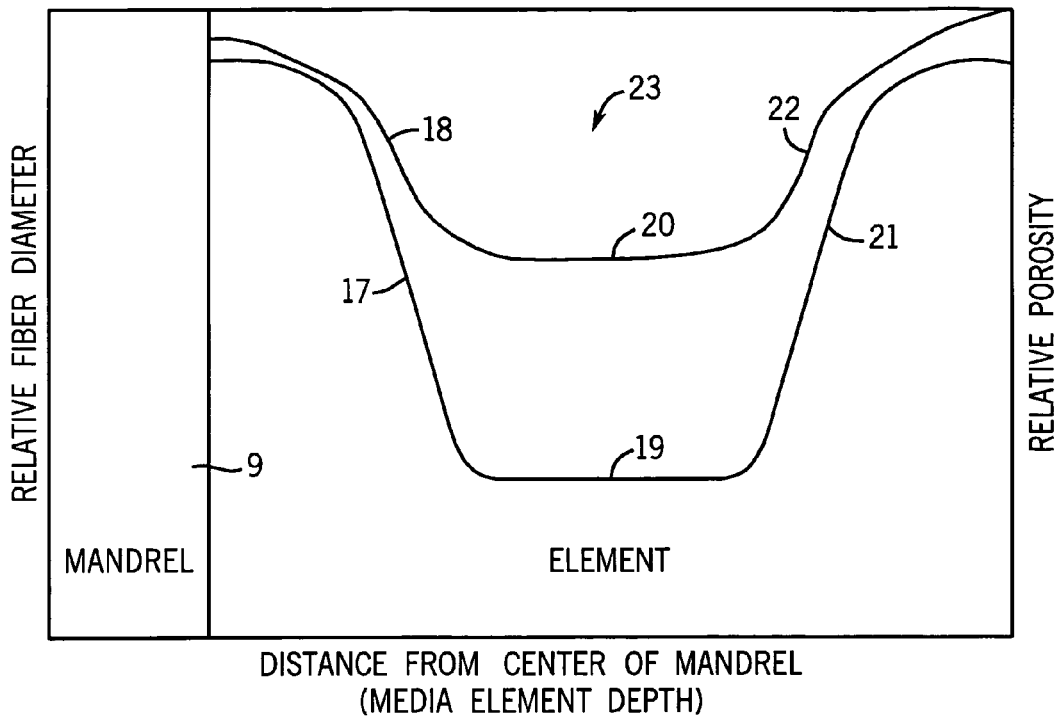

In a second coalescer embodiment example, the same polymer mixture is used to achieve a bi-modal distribution, however the distance between the die and collector mandrel is decreased at the beginning of coalescer element production (e.g. near the center 15a of an annular element 15 adjacent the mandrel), then gradually increased near the middle of element production, e.g. mid depth 15b for the media, and then decreased again near the end of the element production, e.g. at the outer portion 15c of the annular element. This is achieved by moving the die 3 and mandrel 9 relative to one another in the X direction. Simultaneously, the die 3 and mandrel 9 may be moved relative to one another in the Z direction to achieve a desired fiber orientation. This results in an element structure with coarser fibers of both types near filter face 15a to facilitate removal of coarser contaminants, but not finer contaminants, at the upstream side of the element when used in an inside-out flow geometry. Fiber diameter is at a maximum at regions 15a and 15c, and is at a minimum at region 15b. Fiber diameter decreases from region 15a to 15b, and then increases from region 15b to region 15c. Porosity is at a maximum at regions 15a and 15c, and is at a minimum at region 15b. Porosity decreases from region 15a to region 15b, and then increases from region 15b to region 15c. Fiber diameter and porosity vary as a function of distance outwardly from mandrel 9, i.e. vary as a function of filter depth from region 15a to region 15b and from region 15b to region 15c. This is illustrated in FIG. 3 showing distance from the center of the mandrel along the abscissa or horizontal axis, which is the radial depth of the element 15, and showing along the ordinate or vertical axis the relative fiber diameter and relative porosity. The noted variance of fiber diameter and porosity decreasing from region 15a to 15b is shown at downward slopes 17, 18, and the fiber diameter and porosity at mid depth region 15b is shown at 19, 20, and the increasing fiber diameter and porosity from mid depth region 15b to downstream region 15c is shown at 21, 22, resulting in a U-shaped profile 23.

The noted U-shaped profile 23, FIG. 3, results in a net lowering of the total restriction across the coalescer element. The noted varying fiber diameter has a U-shaped profile 23 in a plot, FIG. 3, of element depth along the abscissa versus fiber diameter along the ordinate, with minimum fiber depth diameter at the bight 19 of the U at the noted mid depth 15b. Likewise, the noted varying porosity has a U-shaped profile in a plot of element depth along an abscissa versus porosity along an ordinate, with minimum porosity at the bight of the U at the noted mid depth 15b. Fiber diameter and porosity decrease from region 15a to region 15b where a minimum is achieved for both parameters at which point removal and restriction is highest. From this minimum, fiber diameter and porosity again increase from region 15b to region 15c to reduce restriction and facilitate drainage of captured coalesced liquid from the coalescer. The gradual change in both fiber diameter and porosity avoids the flow discontinuities and contaminant build-up discontinuities inherent in multimedia elements having different layers or sheets of different media material and/or different layers or sheets of different fiber diameter and/or different layers or sheets of different porosity. Instead, the gradual change in both fiber diameter and porosity in the application, e.g. along the noted individual continuous fiber, eliminates step-change discontinuities and reduces restriction and increases service life of the coalescer. In a coalescer, capillary pressure holds the droplets in place. If a step-change is encountered, e.g. a large pore down to a small pore, then movement of the droplet is working against capillary pressure to get the droplet to move into the smaller pore, which significantly increases restriction. This undesirable characteristic is avoided in the present system by providing a gradual change, e.g. avoiding formation of different layers and trying to force droplets therethrough. For dispersed phase wetted media, this is particularly significant in the uphill portions 21, 22 of the noted U-shaped profile 23. For dispersed phase non-wetted media, this is particularly significant in the downhill portions 17, 18 of the noted U-shaped profile 23. The parent application gradually varies the fiber diameter of the same such given individual fiber from a first diameter in a first annular region to a second diameter in a second annular region (e.g. from 15a to 15b and/or from 15b to 15c) to provide a gradual transition therebetween, eliminating abrupt step function changes and corresponding discontinuities, including in fluid flow velocity and pressure drop characteristics, which otherwise increase restriction and reduce life and capacity.

The above examples note annular element rolls having a closed loop shape, e.g. circular, oval, elliptical racetrack, triangular, rectangular, diamond, trapezoidal, star-shaped, and so on. In some applications, packaging or other reasons may dictate other shapes or open shapes, such as flat panel configurations. These may be made from the noted closed loop annular shape by cutting or splitting the resultant element axially along a plane parallel to the axis of the annulus to provide a panel element or the like or otherwise obtain a desired cross-section.

In the parent application the diameter of individual fibers of the coalescer is controlled and varied along the length of the fiber. Fiber diameter, pore size and/or porosity are varied as a function of depth in the coalescer element and is accomplished using the same media and same media sheet, i.e. the same media and media sheet is used to obtain a wide range of properties. Fiber diameter, pore size and/or porosity may be varied continuously and gradually, eliminating the noted step—changes in media properties as a function of depth and avoiding the corresponding discontinuities in fluid flow velocity and pressure drop characteristics within the element, resulting in longer lasting elements. The noted gradual continuous changes may be achieved by varying and controlling the melt blown production parameters, including for example the distance between the die and mandrel/collector, the relative position of the die and mandrel to one another, polymer throughput, air pressure, flow rate, mandrel/collector speed, and temperature. Media properties as a function of depth may be varied and controlled by moving the die and collector relative to one another in the X, Y and/or Z directions. The system combines concepts to produce coalescers wherein fiber diameter, pore size and/or porosity vary as a function of depth giving performance advantages. There is no need to produce separate multiple layers in serial fashion, whether each layer is produced independently by different melt blowing machines and the unfinished element is transferred from machine to machine, or whether layering is accomplished by aligning multiple dies in serial fashion along the Z direction and continuously producing tubular elements that grow or progress in the same Z direction, with the finished element cut to length after the last die, with each die in the series producing a different layer with its own properties.

The parent application provides a method of making a coalescer element 15 by melt blowing a plurality of polymer fibers 7 onto a collector 8, and during the melt blowing, varying the diameter of individual fibers along their length such that an individual fiber has differing diameters at different points along its length. Fibers 7 are melt blown from die 3 ejecting melted polymer through spinnerets 6 to produce the fibers. Fiber diameter is varied along the length of the fiber during fiber production. Collector 8 is spaced from die 3, and in one embodiment fiber diameter along the length of the fiber is varied during fiber production by varying the spacing between collector 8 and die 3. When collector 8 is a rotating mandrel 9 in such embodiment, fiber diameter is varied along the length of the fiber during fiber production by varying the relative position of die 3 and mandrel 9 relative to one another along at least one of the X and Y axes. In another embodiment, fiber diameter is varied along the length of the fiber during fiber production by varying polymeric throughput through spinnerets 6. Polymer is ejected through spinnerets 6 into a pressurized gas stream, as noted above, to produce fibers 7. In another embodiment, fiber diameter is varied along the length of the fiber during fiber production by varying at least one of the gas pressure and gas flow rate. In another embodiment when collector 8 is a rotating mandrel 9, fiber diameter is varied along the length of the fiber during fiber production by varying the speed of rotation of mandrel 9. In another embodiment, fiber diameter is varied along the length of the fiber during fiber production by varying the temperature of the melted polymer. In another embodiment, two polymers are used simultaneously in the die to produce a bi-modal fiber distribution, with fiber diameter of each mode being varied as above described. In one embodiment, the two polymers have different melting points. In the preferred embodiment of the noted methods, fiber diameter is varied along the length of the fiber during fiber production while the fibers are being melt blown from die 3.

When collector 8 is a rotating mandrel 9, the rotating mandrel collects and rolls fibers 7 into an annular element roll 15 having an inner region 15a at the mandrel, and having an outer region 15c spaced radially outwardly of inner region 15a by the radial thickness of the element roll. Element roll 15 has a depth dimension along such radial thickness. Fiber diameter is varied along the length of the fiber during fiber production such that fiber diameter varies as a function of element depth. In one embodiment, as noted, fiber diameter is varied along the length of the fiber during fiber production to provide a first annular region such as 15a of a first fiber diameter, and a second annular region such as 15b and/or 15c of a second fiber diameter different than the first fiber diameter and of the same individual melt blown fiber. An individual fiber is melt blown from die 3. Such individual fiber is rolled on mandrel 9 to form the noted first annular region. The same such given individual fiber is rolled on the first annular region to form a second annular region such as 15b, and the same such given individual fiber is further rolled on second annular region 15b to form a third annular region such as 15c, and so on as desired. The given individual fiber is rolled at the noted first diameter in first annular region 15a, then the fiber diameter of the same such given individual fiber is gradually varied to a second diameter, and then the same such given individual fiber is rolled at such second fiber diameter in second annular region 15b, and so on. The given individual fiber may be rolled in other annular regions in sequential steps but still rolling the same such given individual fiber, thus providing the noted continuity and gradual changes and avoiding the above noted step-change discontinuities. The change in diameter of the given individual fiber occurs gradually during melt blowing, and the change from region to region across the radial thickness and depth of the element is gradual.

One of the inner and outer regions 15a and 15c is at an upstream surface, and the other of the inner and outer regions 15a and 15c is at a downstream surface. The direction of flow is from upstream to downstream. For example, in an inside-out flow geometry, region 15a is at the upstream surface, and region 15c is at the downstream surface. In an outside-in flow geometry, outer region 15c is at the upstream surface, and inner region 15a is at the downstream surface. In one embodiment, as above noted, fiber diameter is varied along the length of the fiber during fiber production to vary fiber diameter as a function of element depth such that fiber diameter decreases with increasing depth into the element along the flow direction. Further in such embodiment, the fibers are rolled such that porosity also decreases with increasing depth into the element along the flow direction. In another embodiment, fiber diameter along the length of the fiber is varied during fiber production to vary fiber diameter as a function of element depth such that fiber diameter increases with increasing depth into the element along the flow direction. Further in such embodiment, the fibers are rolled such that porosity also increases with increasing depth into the element along the flow direction. In another embodiment, fiber diameter along the length of the fiber is varied during fiber production to vary fiber diameter as a function of element depth such that fiber diameter decreases with increasing depth into the element along the flow direction from upstream to mid depth 15b, and then increases with increasing depth into the element along the flow direction from mid depth 15b to downstream. These characteristics are shown in FIG. 3 at U-shaped profile 23. Further in such embodiment, the fibers are rolled such that porosity decreases with increasing depth into the element along the flow direction from upstream to mid depth 15b, and then increases with increasing depth into the element along the flow direction from mid depth 15b to downstream. Typically, fiber diameter and porosity follow the same increasing or decreasing trend with respect to element depth, however not necessarily. For example, an element may have decreasing fiber diameter while porosity increases, or vice versa.

The system further provides a method of making a coalescer by melt blowing a plurality of polymer fibers onto a collector, and during the melt blowing, controllably varying the porosity of the coalescer formed by the fibers, e.g. by varying fiber diameter as above described and/or by the noted rolling. In one embodiment, porosity decreases with increasing depth into the coalescer. In another embodiment, porosity increases with increasing depth into the coalescer. In another embodiment, porosity decreases with increasing depth into the coalescer from upstream to mid depth 15b, and then increases with increasing depth into the coalescer from mid depth 15b to downstream, FIG. 3. In a further embodiment, porosity is controllably varied by providing a compression roller 16 engaging and applying pressure against coalescer element roll 15 at the outer surface at region 15c during formation thereof. In a further embodiment, porosity is varied to provide a first annular region such as 15a of a first porosity, a second annular region such as 15b of a second porosity different than the first porosity and of the same individual melt blown fiber, and a third annular region such as 15c of a third porosity different than the first and/or second porosity and of the same individual melt blown fiber, and so on. A given individual fiber is melt blown from die 3. Such given individual fiber is rolled on mandrel 9 to form first annular region 15a, and the same such given individual fiber is rolled on first annular region 15a to form second annular region 15b, and so on.

The parent application provides a coalescer having a plurality of melt blown fibers wherein the diameter of an individual fiber varies along the length of the fiber such that an individual fiber has differing diameters at different points along its length. Fiber diameter is varied along the length of the fiber to provide an individual fiber having differing diameters at different points along its length such that fiber diameter of such individual fiber varies as a function of coalescer depth. The coalescer has a first region such as 15a of a first fiber diameter, a second region such as 15b of a second fiber diameter different than the first fiber diameter and of the same individual melt blown fiber, and so on. As above noted, the change in fiber diameter is gradual to avoid the noted discontinuities and step-changes and the noted disadvantages inherent therein. In one embodiment, fiber diameter varies along the length of the individual fiber to vary fiber diameter as a function of element depth such that fiber diameter along the individual fiber decreases with increasing depth into the element. Further in such embodiment, porosity also preferably decreases with increasing depth into the element. In another embodiment, fiber diameter varies along the length of the individual fiber to vary fiber diameter as a function of element depth such that fiber diameter along the individual fiber increases with increasing depth into the element. In such embodiment, porosity also preferably increases with increasing depth into the element. In another embodiment, fiber diameter varies along the length of the individual fiber to vary fiber diameter as a function of element depth such that fiber diameter along the individual fiber decreases with increasing depth into the element from upstream to mid depth 15b, and then increases with increasing depth into the element from mid depth 15b to downstream, FIG. 3. In such embodiment, porosity preferably decreases with increasing depth into the element from upstream to mid depth 15b, and then increases with increasing depth into the element from mid depth 15b to downstream. The system provides a coalescer produced by the noted method of making a coalescer including melt blowing a plurality of polymer fibers onto a collector, and during the melt blowing, varying the diameter of individual fibers along their length such that an individual fiber has differing diameters at different points along its length.

The system and method also provides a coalescer having a plurality of melt blown fibers, with the coalescer having an upstream surface spaced from a downstream surface by a depth dimension therebetween, with the coalescer having a first depth region of a first porosity, and a second depth region downstream of the first depth region and of a second porosity different than the first porosity and of the same individual melt blown fiber of the first region. As above noted, the change is gradual to avoid the noted disadvantages of discontinuities or step-changes. In one embodiment, porosity decreases with increasing depth into the coalescer element. In another embodiment, porosity increases with increasing depth into the element. In another embodiment, porosity decreases with increasing depth into the element from upstream to mid depth 15b, and then increases with increasing depth into the element from mid depth 15b to downstream, FIG. 3. The system provides a coalescer produced by the noted method of making a coalescer by melt blowing a plurality of polymer fibers onto a collector, and during the melt blowing, controllably varying the porosity of the coalescer formed by the fibers.

It is expected that numerous of the above techniques may also be applied to particulate filters. For example, in a solids filter embodiment, the same polymer mixture may be used to achieve a bi-modal distribution, and the distance between the die 3 and mandrel 9 is increased at the beginning of element production at region 15a, then gradually decreased as the diameter of the element and the thickness of the media increases from region 15a to region 15b and 15c. As in the above example, this is accomplished by moving die 3 and mandrel 9 relative to one another in X and Z directions. This results in an element structure with finer fibers of both types in region 15a to facilitate the removal of fine particles at the downstream side of the element for outside-in flow geometry, and coarse particle and sludge removal by coarse fibers at the upstream side 15c in such outside-in flow geometry. Fiber diameter is at a minimum at region 15a and gradually increases to an increased fiber diameter at region 15b and continues to increase to a maximum fiber diameter at region 15c. Porosity is at a minimum at region 15a and increases to a higher porosity at region 15b and continues to increase to a maximum porosity at region 15c. Fiber diameter and porosity thus change as a function of distance from mandrel 9, i.e. as a function of radial thickness and filter depth dimension. This results in a net lowering of the total restriction across the filter element because restriction and efficiency gradually increase as the fluid penetrates further into the element. The gradual change in both fiber diameter and porosity avoids the flow and contaminant build-up discontinuities inherent in multi-media filters of multiple layers or sheets of different filter media of different fiber diameter and/or porosity. The noted gradual change eliminates step-change discontinuities and reduces restriction and increases service life.

Present Application

The following description uses like reference numerals from above where appropriate to facilitate understanding.

The present system provides a method of making a filter element 30, similar to filter element 15, including using one or more dies 3, 32, 34, etc., spinning fibers 7, 36, 38 onto collector 8. The above noted coordinate system of FIG. 1 is also illustrated in FIG. 4, namely X, Y, Z axes orthogonal to each other, with the X and Y axes defining an X-Y plane transverse to the Z axis. Collector 8 is a rotating mandrel 9 rotating about the Z axis. A first of the dies, e.g. die 3, is spaced from mandrel 9 along the X axis, and at least a second of the dies such as die 32 is spaced from first die 3 along at least one of the X-Y plane and the Z axis, to be described. In the preferred embodiment, the method includes effecting relative movement of the collector and at least one of the dies during or before rotating, to determine a filter characteristic. The method includes spinning a first set of fibers 7 from a first of the dies, e.g. die 3, and spinning a second set of fibers 36 from a second of the dies 32, and spinning a third set of fibers 38 from a third of the dies 34, etc. One embodiment includes spinning a first set of fibers of a given filter characteristic from a first of the dies, and spinning a second set of fibers of the same such given filter characteristic from a second of the dies, and so on, to increase production speed. In another embodiment, the method includes spinning a first set of fibers 7 of a first filter characteristic from a first of a plurality of dies, e.g. die 3, and spinning a second set of fibers 36 of a second different characteristic from a second of the dies 32, and spinning a third set of fibers 38 from a third of the dies 34, etc. The filter characteristic is preferably selected from the group consisting of porosity, wettability, surface energy, fiber diameter, fiber material, and fiber distribution as noted above. In a further embodiment, the method includes spinning a first set of fibers 7 in a first filter pattern from a first die 3, and spinning a second set of fibers 36 in a second filter pattern from a second die 32, and so on. In the preferred embodiment, the spinning step is a fiber spinning step selected from the group consisting of melt spinning, melt blowing, spun bonding, electrospinning, and air laying.

In various filter and coalescer applications, it is desirable for filter characteristics such as physical and chemical properties of the filter media, including localized fiber diameter size, distribution, porosity, and wettability, to vary as a function of depth. For example, in solid particulate filter applications, it is desirable for porosity and fiber diameter to decrease with depth into the media in order to increase the dust holding capacity and life of the filter. In coalescer applications, it is desirable to for porosity to decrease with depth into the media and then increase again to facilitate drainage. It is also desirable to vary the coalescer media wettability characteristics as a function of depth, in order to improve droplet capture and drainage of coalesced drops. By using different filter materials such as glass fibers or different polymer chemistry, one can achieve higher degrees of filtration, lower pressure drop, and higher efficiency if the media is layered correctly.

The present system provides refinements to the above noted manufacturing process to produce filter elements such that media properties and filter characteristics vary as a function of depth. These refinements increase the speed and flexibility of filter element production. The system includes the use of multiple dies operating from different orientations and/or positions with respect to the filter element forming mandrel, respective dies spinning fiber under different or the same conditions, spinning fibers of controlled diameter, porosity, and chemistries, controlling and varying fiber production spinning process conditions, e.g. polymer flow rate, polymer temperature, air pressure, air flow rate, air temperature, mandrel axial velocity relative to the dies, mandrel rotational velocity, distance and angle between the die and mandrel, and polymer type during element production, to form filter elements whose media properties and filter characteristics vary as a function of depth.

In one embodiment, the method involves serially spinning fibers from different dies such that a first set of fibers 7 are spun onto rotating mandrel 9 from first die 3 forming a first annular zone 30a FIG. 5, of the first set of fibers 7, and then a second set of fibers 36 are spun onto rotating mandrel 9 from second die 32 forming a second annular zone 30b of the second set of fibers 36, and then a third set of fibers 38 are spun onto rotating mandrel 9 from third die 34 forming a third annular zone 30c of the third set of fibers 38, and so on. In the embodiment of FIGS. 4, 5, second die 32 is spaced from first die 3 along the noted X-Y plane, and second annular zone 30b is radially outward of first annular zone 30a. Third die 34 is spaced from first and second dies 3 and 32 along the noted X-Y plane, and third annular zone 30c is radially outward of second annular zone 30b. The method involves spinning fibers from second die 32 serially sequentially after first die 3, and spinning fibers from third die 34 serially sequentially after second die 32. In one embodiment, at least one parameter is varied from die to die such that at least one filter characteristic varies as a function of radial depth into the filter element. For example, at least one of the following parameters is varied: polymer flow rate, polymer temperature; air pressure; air flow rate; air temperature; mandrel axial velocity along the Z axis relative to the dies; mandrel rotational velocity about the Z axis; distance and angle between at least one die and the mandrel; polymer type. In one embodiment, the method involves varying fiber diameter during spinning, as noted above, such that fiber diameter decreases from first annular zone 30a to second annular zone 30b, and then increases from second annular zone 30b to third annular zone 30c, to provide varying fiber diameter along a U-shaped profile, FIG. 3, in a plot of element depth along an abscissa versus fiber diameter along an ordinate, with minimum fiber at the bight of the U at mid depth. In another embodiment, the method involves varying porosity, as above noted, during spinning such that porosity decreases from first annular zone 30a to second annular zone 30b, and then increases from second annular zone 30b to third annular zone 30c, to provide varying porosity along a U-shaped profile, FIG. 3, in a plot of element depth along an abscissa versus porosity along an ordinate, with minimum porosity at the bight of the U at mid depth. In various embodiments, during the noted fiber spinning and the rotating of mandrel 9 about the Z axis, one of the dies 3, 32, 34 and/or mandrel 9 are translated along the Z axis. FIG. 4 shows the three dies 3, 32, 34, spaced from each other in the X-Y plane by 90°. In another embodiment which may be preferred in various applications, the dies are spaced from each other by 60°, FIG. 5.

In the system of FIGS. 4, 5, two, three or more dies may be used. Each die may supply a different or the same polymer or polymer mixture and be activated at different times corresponding to different depths into the filter media element, to produce different desired filter characteristics. Each die may be independently controlled, in terms of spatial location with respect to the mandrel, polymer throughput, air pressure, flow rate, mandrel/collector speed, temperature. Various types of fiber spinning, e.g. melt spinning, melt blowing, spun bonding, electrospinning, air laying, etc., may be used for desired characteristics, e.g. different types of polymer may be melt blown or air laid to achieve the desired characteristics, e.g. porosity, fiber diameter, wettability, chemical compatibility. In the disclosed embodiment, the three dies are used to produce a filter element with three zones or layers. Other embodiments may use other numbers of dies. Within each zone or layer there are continuous fibers from start to finish of the layer and forming, if desired, varying fiber diameter and porosity within each layer. Once a layer or zone is formed, fiber production from the corresponding die is halted, and production of a different type of fiber from a different die is initiated. This allows filter elements with depth profiles that vary in terms of fiber diameter, porosity, chemistry, and wettability. For example, to produce a crankcase ventilation coalescer with inside to outside flow, the first die 3 may be used to melt blow a polyethyleneterterephthalate (PET) layer with fiber diameter starting at 20 µm and decreasing to 5 µm. This die can then be deactivated, and the second die 32 activated to air lay a microglass layer with one micron fiber diameter. The second die 32 may then be deactivated, and the third die 34 activated to melt blow a polyphenylene sulfide (PPS) layer starting at 5 µm and increasing to 20 µm. This provides a filter element with graded fiber diameter and wettability characteristics suitable for the noted application.

In another embodiment, the method involves simultaneously spinning fibers from different dies during a first time increment to form a first annular zone 30d, FIG. 6, then varying at least one parameter and simultaneously spinning fibers from the different dies during a second serially sequential time increment to form a second annular zone 30e, then varying at least one parameter and simultaneously spinning fibers from the different dies during a third serially sequential time increment to form a third annular zone 30*f*, and so on. In a two die embodiment, the first annular zone has first and second subzones 30*d*-1 and 30*d*-2, with the first subzone 30*d*-1 having fibers spun from first die 3 during the first time increment, and the second subzone 30*d*-2 having fibers spun from second die 32 during the first time increment. In the case of a three die embodiment, first annular zone 30*d* additionally has a third subzone 30*d*-3 having fibers spun from third die 34 during the noted first time increment. Second annular zone 30*e* has subzone 30*e*-1 having fibers spun from die 3 during the noted second time increment, and has subzone 30*e*-2 having fibers spun from die 32 during the noted second time increment, and has subzone 30*e*-3 having fibers spun from die 34 during the noted second time increment. Third annular zone 30*f* has subzone 30*f*-1 having fibers spun from die 3 during the noted third time increment, and has subzone 30*f*-2 having fibers spun from die 32 during the noted third time increment, and has subzone 30*f*-3 having fibers spun from die 34 during the noted third time increment, and so on. In the preferred embodiment, at least one of the noted subzones has a different filter characteristic than at least another of the subzones. In one embodiment, the subzones are formed as follows: subzone 30*d*-1 is 20 μm PET; subzone 30*d*-2 is 10 μm glass; subzone 30*d*-3 is 20 μm PPS; subzone 30*e*-1 is 5 μm PET; subzone 30*e*-2 is 1 μm glass; subzone 30*e*-3 is 5 μm PPS; subzone 30*f*-1 is 20 μm PET; subzone 30*f*-2 is 10 μm glass; subzone 30*f*-3 is 20 μm PPS.

In the noted continuous fiber production embodiment, each die is used to continually spin fiber during element production, so that for each rotation of mandrel 9, three layers of media are simultaneously laid down, with selectably different physical or chemical properties and characteristics. The fiber production conditions for each of the three layers are independently varied in order to achieve a graded structure. Accordingly, three different closely associated fiber layers are continuously being laid onto the element, but the relative amounts and characteristics of each layer are continually adjusted to optimize performance. The amount and characteristics of fiber laid down by each die varies as a function of time and element depth. Since the three layers are intimately associated, gradual transitions among fiber diameter, porosity, wettability, and structural properties can be obtained and used to advantage, for example to wick captured oil away from the capture layers more quickly. Fiber diameter, porosity, wettability, and fiber chemistry may be varied as a function of depth.

In another embodiment, FIG. 7, dies are axially aligned with each other along the noted Z axis, as shown at dies 3 and 40. The dies may have the same axial length, FIG. 8, or may have different axial lengths as shown in FIG. 9 at 3 and 42. More than two dies may be axially aligned, for example as shown in FIG. 10 at 3, 44, 46, 48, and which may have the same axial length, FIG. 11, or may have different axial lengths as shown in FIG. 12 at 3, 50, 52, 54. Another set of dies 56, 58, FIG. 13, may be axially aligned with each other along and be laterally offset from dies 3 and 40. Dies 3, 40, 56, 58 may have the same axial length, FIG. 14, or may have different axial lengths as shown in FIG. 15 at 3, 60, 62, 64. In one embodiment, FIG. 16, the dies have staggered lengths along the Z axis as shown at 3, 66, 68, 70, such that die 66 overlaps dies 68 and 70, and such that die 68 overlaps dies 3 and 66. Staggered lengths providing overlap is also illustrated in FIGS. 17, 18, 19.

The noted axially spaced and laterally offset die combinations provide multiple dies axially aligned and laterally offset in side by side relation with respect to mandrel 9. As the filter element 30 is formed, the mandrel and/or the dies move back and forth in a controlled axial direction along the Z axis creating new uniform media characteristics and coverage along the length of the filter element. In order to ensure uniform coverage along the element length, the relative axial distance of travel for each die should cover the entire length of the element, i.e. one or more dies will go past the end of the element at each end of the element producing some excess which should be trimmed off. In some cases, it may be desirable for the element to have differing fiber characteristics with respect to element length, and it may be unnecessary to trim the element. It may be desirable to use a common hopper and melt pump to feed each die, with different fiber spinning and/or polymer and/or air flow rates, pressures, and/or temperatures for each die in order to create localized media layers of the same fiber or polymer with different fiber diameter and porosity characteristics resulting from each die. Several different methods can be used to vary the characteristics of the fiber generated by the various dies, including but not limited to: controlling the air flow rate, pressure, temperature independently; controlling the polymer flow rate, pressure, temperature independently; using dies with differing length and nozzle dimensions; and/or using independent hoppers and melt pumps to allow different polymers to be used for each die. During production of a filter element, fiber and/or molten polymer can be continuously or intermittently spun or blown onto the mandrel to produce the desired structure and composition. The rotational and axial speed of the mandrel can be varied to optimize the production rate and control the orientation of fiber with the formed element. Further sets of dies may be laterally or circumferentially offset from other dies, e.g. FIGS. 13-19, to increase the amount of fiber produced per unit time, and increase production speed.

In the preferred embodiment, the noted effective relative movement between collector 8 and at least one of the dies 3, 32, 34, etc., occurs during the noted rotating of mandrel 9 during fiber spinning. In an alternative, such effective relative movement occurs before such rotating, e.g. during set-up between filter elements, in preparation for forming the next filter element. The dies have a plurality of die openings 6 aligned along a row such as 11. In one embodiment, row 11 is aligned parallel to the Z axis. In another embodiment, row 11 is aligned along a direction obliquely skewed relative to the Z axis. In a further embodiment, only a single die 3 is provided for spinning fibers onto collector 8 in the noted coordinate system, and the row 11 of die openings 6 extends along a direction obliquely skewed relative to the Z axis. In one form, row 11 extends between first and second ends, with the first end of row 11 being spaced from mandrel 9 by a first spacing distance along the X axis, and the second end of row 11 being spaced from mandrel 9 by a second spacing distance along the X axis, with the noted second spacing distance being greater than the noted first spacing distance. The X and Z axes define an X-Z plane, and in the latter noted embodiment, row 11 lies in such X-Z plane. In a further form, row 11 of the die openings 6 extends between first and second ends, with the first end of row 11 being spaced from mandrel 9 by a first spacing distance along the X axis, and with the second end of row 11 being spaced from mandrel 9 by a second spacing distance along the X and Y axes, with the noted second spacing distance being greater than the noted first spacing distance. In such latter noted form, row 11 is oblique to the X-Y plane.

In the foregoing description, certain terms have been used for brevity, clearness, and understanding. No unnecessary limitations are to implied therefrom beyond the requirement of the prior art because such terms are used for descriptive purposes and are intended to be broadly construed. The different configurations, methods, and systems described herein may be used alone or in combination with other configurations, methods, and systems. It is to be expected that various equivalents, alternatives and modifications are possible within the scope of the appended claims.

What is claimed is:

1. A method of making a filter element comprising spinning fibers from a plurality of dies onto a collector in a coordinate system having X, Y, Z axes orthogonal to each other, said X and Y axes defining an X-Y plane transverse to said Z axis, wherein said collector comprises a rotating mandrel rotating about said Z axis, and comprising spacing at least a first of said dies from said mandrel along said X axis, namely said first die, and spacing at least a second of said dies from said first die along said X-Y plane, namely said second die, said first and second dies being coplanar in the same said X-Y plane and positioned about said Z axis, and varying fiber diameter along the length of the fiber during fiber production by varying distance between said mandrel and said first die by moving said mandrel and said first die relative to one another in said Y axis during or before said rotating, wherein the fibers spun from said first die are filtration fibers forming a first annular filtration zone, and the fibers spun from said second die are filtration fibers forming a second annular filtration zone, spinning said filtration fibers from each of said first and second dies spaced along said X-Y plane directly onto said rotating mandrel, the method further comprising spinning a first set of fibers of a first filter characteristic from said first die, and spinning a second set of fibers of a second different filter characteristic from said second die.

2. The method according to claim 1 wherein each of said filter characteristics is selected from the group consisting of porosity; wettability; surface energy; fiber diameter; fiber material; and fiber distribution.

3. The method according to claim 1 comprising spinning a first set of fibers in a first filter pattern from a first of said dies, and spinning a second set of fibers in a second different filter pattern from a second of said dies.

4. The method according to claim 1 wherein said spinning step is a fiber spinning step selected from the group consisting of: melt spinning; melt blowing; spun bonding; electrospinning; and air laying.

5. The method according to claim 1 comprising serially spinning fibers from different said dies such that a first set of fibers is spun onto said rotating mandrel from said first die forming said first annular filtration zone of said first set of fibers, and then a second set of fibers is spun onto said rotating mandrel from said second die forming said second annular filtration zone of said second set of fibers.

6. The method according to claim 5 comprising spacing said second die from said first die along said X-Y plane, and wherein said second annular filtration zone is radially outward of said first annular filtration zone and radially aligned with said first annular filtration zone relative to said Z axis including during said spinning.

7. The method according to claim 6 comprising varying at least one parameter from die to die such that at least one filter characteristic varies as a function of radial depth into said filter element.

8. The method according to claim 7 wherein said parameter is selected from the group consisting of: polymer flow rate; polymer temperature; air pressure; air flow rate; air temperature; mandrel axial velocity along said Z axis relative to said dies; mandrel rotational velocity about said Z axis; distance and angle between said dies and said mandrel; and polymer type.

9. The method according to claim 5 comprising, during said spinning and said rotating, translating at least one of said mandrel and said dies along said Z axis.

10. The method according to claim 1 comprising coplanarly aligning third and fourth dies with each other along a second X-Y plane laterally offset from said first and second dies in said first X-Y plane.

11. The method according to claim 10 comprising providing said dies with staggered and different lengths along said Z axis such that said second die overlaps said third and first dies, and such that said third die overlaps said fourth and second dies.

12. The method according to claim 1 comprising effecting said relative movement during said rotating.

13. The method according to claim 1 comprising effecting said relative movement before said rotating.

14. The method according to claim 1 wherein at least one of said dies has a plurality of die openings aligned along a row, and comprising aligning said row parallel to said Z axis.

15. The method according to claim 1 wherein at least one of said dies has a plurality of die openings aligned along a row, and comprising aligning said row along a direction obliquely skewed relative to said Z axis.

16. The method according to claim 1 wherein said first and second dies are spaced from each other in the X-Y plane by 90°.

17. The method according to claim 1 wherein said first and second dies are spaced from each other in the X-Y plane by 60°.

18. The method according to claim 1 wherein said fibers spun from said first die are polymeric fibers and said fibers spun from said second die are different polymeric fibers.

19. The method according to claim 1 wherein said fibers spun from said first die are polymeric fibers and said fibers spun from said second die are non-polymeric fibers.

20. The method according to claim 1 wherein said fibers spun from said first die are polymeric fibers and said fibers spun from said second die are microglass fibers.

21. The method according to claim 20, wherein the fibers spun from the first die have a fiber diameter within a range of 5-20 microns.

22. The method according to claim 1, further comprising effecting relative movement of said mandrel and at least one of said dies along said X axis during or before said rotating.

23. The method according to claim 1, comprising effecting relative movement of said mandrel and at least one of said dies along said Y axis during said rotating.

24. A method of making a filter element comprising spinning fibers from a plurality of dies onto a collector in a coordinate system having X, Y, Z axes orthogonal to each other, said X and Y axes defining an X-Y plane transverse to said Z axis, wherein said collector comprises a rotating mandrel rotating about said Z axis, and comprising spacing at least a first of said dies from said mandrel along said X axis, namely said first die, and spacing at least a second of said dies from said first die along said X-Y plane, namely said second die, said first and second dies being coplanar in the same said X-Y plane and positioned about said Z axis, and varying fiber diameter along the length of the fiber during fiber production by varying distance between said mandrel and said first die by moving said mandrel and said first die relative to one another in said Y axis during or before said rotating, wherein the fibers spun from said first die are filtration fibers forming a first annular filtration zone, and the fibers spun from said second die are filtration fibers forming a second annular filtration zone, spinning said filtration fibers from each of said first and second dies spaced along said X-Y plane directly onto said rotating mandrel, the method comprising serially spinning fibers from different said dies such that a first set of fibers is spun onto said rotating mandrel from said first die forming said first annular filtration zone of said first set of fibers, and then a second set of fibers is spun onto said rotating mandrel from said second die forming said second annular filtration zone of said second set of fibers, the method comprising spacing said second die from said first die along said X-Y plane, and wherein said second annular filtration zone is radially outward of said first annular filtration zone and radially aligned with said first annular filtration zone relative to said Z axis including during said spinning, the method further comprising spacing a third of said dies from said first and second dies along said X-Y plane, namely said third die, and spinning filtration fibers from said third die serially sequentially after said second die, such that a third set of filtration fibers is spun onto said rotating mandrel from said third die forming a third annular filtration zone of said third set of fibers, wherein said third annular filtration zone is radially outward of said second annular filtration zone, the method further comprising spinning a first set of fibers of a first filter characteristic from said first die, spinning a second set of fibers of a second filter characteristic from said second die, and spinning a third set of fibers of a third filter characteristic from said third die.

25. The method according to claim 24 wherein said first and second dies are spaced from each other in the X-Y plane by 90° and said second and third dies are spaced from each other in the X-Y plane by 90°.

26. The method according to claim 24 wherein said first and second dies are spaced from each other in the X-Y plane by 60° and said second and third dies are spaced from each other in the X-Y plane by 60°.

27. The method according to claim 24 wherein said fibers spun from said first die are polymeric fibers and said fibers spun from said third die are polymeric fibers.

28. The method according to claim 24 wherein said fibers spun from said first die are polymeric fibers and said fibers spun from said third die are different polymeric fibers.

29. The method according to claim 24 wherein said fibers spun from said first die are polymeric fibers, said fibers spun from said second die are microglass fibers, and said fibers spun from said third die are different polymeric fibers.

30. The method according to claim 29, wherein said fibers spun from said first and third dies have a fiber diameter within a range of 5-20 microns.

31. The method according to claim 24, further comprising effecting relative movement of said mandrel and at least one of said dies along said X axis during or before said rotating.

32. The method according to claim 24, comprising effecting relative movement of said mandrel and at least one of said dies along said Y axis during said rotating.

33. A method of making a filter element comprising spinning fibers from a plurality of dies onto a collector in a coordinate system having X, Y, Z axes orthogonal to each other, said X and Y axes defining an X-Y plane transverse to said Z axis, wherein said collector comprises a rotating mandrel rotating about said Z axis, and comprising spacing at least a first of said dies from said mandrel along said X axis, namely said first die, and spacing at least a second of said dies from said first die along said X-Y plane, namely said second die, said first and second dies being coplanar in the same said X-Y plane and positioned about said Z axis, and varying fiber diameter along the length of the fiber during fiber production by varying distance between said mandrel and said first die by moving said mandrel and said first die relative to one another in said Y axis during or before said rotating, wherein the fibers spun from said first die are filtration fibers forming a first annular filtration zone, and the fibers spun from said second die are filtration fibers forming a second annular filtration zone, spinning said filtration fibers from each of said first and second dies spaced along said X-Y plane directly onto said rotating mandrel, the method further comprising serially spinning fibers from different said dies such that a first set of fibers is spun onto said rotating mandrel from said first die forming said first annular filtration zone of said first set of fibers, and then a second set of fibers is spun onto said rotating mandrel from said second die forming said second annular filtration zone of said second set of fibers comprising spacing said second die from said first die along said X-Y plane, and wherein said second annular filtration zone is radially outward of said first annular filtration zone and radially aligned with said first annular filtration zone relative to said Z axis including during said spinning, the method further comprising spacing a third of said dies from said first and second dies along said X-Y plane, namely said third die, and spinning filtration fibers from said third die serially sequentially after said second die, such that a third set of filtration fibers is spun onto said rotating mandrel from said third die forming a third annular filtration zone of said third set of fibers, wherein said third annular filtration zone is radially outward of said second annular filtration zone, the method further comprising varying fiber diameter during said spinning such that fiber diameter decreases from said first annular zone to said second annular zone, and then increases from said second annular zone to said third annular zone, to provide varying fiber diameter along a U-shaped profile in a plot of element depth along an abscissa versus fiber diameter along an ordinate, with minimum fiber diameter at the bight of the U at mid depth, the method further comprising spinning a first set of fibers of a first filter characteristic from said first die, spinning a second set of fibers of a second filter characteristic from said second die, and spinning a third set of fibers of a third filter characteristic from said third die.

34. The method according to claim 33 wherein said first and second dies are spaced from each other in the X-Y plane by 90° and said second and third dies are spaced from each other in the X-Y plane by 90°.

35. The method according to claim 33 wherein said first and second dies are spaced from each other in the X-Y plane by 60° and said second and third dies are spaced from each other in the X-Y plane by 60°.

36. The method according to claim 33 wherein said fibers spun from said first die are polymeric fibers and said fibers spun from said third die are polymeric fibers.

37. The method according to claim 33 wherein said fibers spun from said first die are polymeric fibers and said fibers spun from said third die are different polymeric fibers.

38. The method according to claim 33 wherein said fibers spun from said first die are polymeric fibers, said fibers spun from said second die are microglass fibers, and said fibers spun from said third die are different polymeric fibers.

39. The method according to claim 38, wherein said fibers spun from said first and third dies have a fiber diameter within a range of 5-20 microns.

40. The method according to claim 33, wherein said fibers spun from said first and third dies have a fiber diameter within a range of 5-20 microns.

41. The method according to claim 33, further comprising effecting relative movement of said mandrel and at least one of said dies along said X axis during or before said rotating.

42. The method according to claim 33, comprising effecting relative movement of said mandrel and at least one of said dies along said Y axis during said rotating.

43. A method of making a filter element comprising spinning fibers from a plurality of dies onto a collector in a coordinate system having X, Y, Z axes orthogonal to each other, said X and Y axes defining an X-Y plane transverse to said Z axis, wherein said collector comprises a rotating mandrel rotating about said Z axis, and comprising spacing at least a first of said dies from said mandrel along said X axis, namely said first die, and spacing at least a second of said dies from said first die along said X-Y plane, namely said second die, said first and second dies being coplanar in the same said X-Y plane and positioned about said Z axis, and varying fiber diameter along the length of the fiber during fiber production by varying distance between said mandrel and said first die by moving said mandrel and said first die relative to one another in said Y axis during or before said rotating, wherein the fibers spun from said first die are filtration fibers forming a first annular filtration zone, and the fibers spun from said second die are filtration fibers forming a second annular filtration zone, spinning said filtration fibers from each of said first and second dies spaced along said X-Y plane directly onto said rotating mandrel, the method further comprising serially spinning fibers from different said dies such that a first set of fibers is spun onto said rotating mandrel from said first die forming said first annular filtration zone of said first set of fibers, and then a second set of fibers is spun onto said rotating mandrel from said second die forming said second annular filtration zone of said second set of fibers comprising spacing said second die from said first die along said X-Y plane, and wherein said second annular filtration zone is radially outward of said first annular filtration zone and radially aligned with said first annular filtration zone relative to said Z axis including during said spinning, the method further comprising spacing a third of said dies from said first and second dies along said X-Y plane, namely said third die, and spinning filtration fibers from said third die serially sequentially after said second die, such that a third set of filtration fibers is spun onto said rotating mandrel from said third die forming a third annular filtration zone of said third set of fibers, wherein said third annular filtration zone is radially outward of said second annular filtration zone, the method further comprising varying porosity during said spinning such that porosity decreases from said first annular zone to said second annular zone, and then increases from said second annular zone to said third annular zone to provide varying porosity along a U-shaped profile in a plot of element depth along an abscissa versus porosity along an ordinate, with minimum porosity at the bight of the U at mid depth, the method further comprising spinning a first set of fibers of a first filter characteristic from said first die, spinning a second set of fibers of a second filter characteristic from said second die, and spinning a third set of fibers of a third filter characteristic from said third die.

44. The method according to claim 43 wherein said first and second dies are spaced from each other in the X-Y plane by 90° and said second and third dies are spaced from each other in the X-Y plane by 90°.

45. The method according to claim 43 wherein said first and second dies are spaced from each other in the X-Y plane by 60° and said second and third dies are spaced from each other in the X-Y plane by 60°.

46. The method according to claim 43 wherein said fibers spun from said first die are polymeric fibers and said fibers spun from said third die are polymeric fibers.

47. The method according to claim 43 wherein said fibers spun from said first die are polymeric fibers and said fibers spun from said third die are different polymeric fibers.

48. The method according to claim 43 wherein said fibers spun from said first die are polymeric fibers, said fibers spun from said second die are microglass fibers, and said fibers spun from said third die are different polymeric fibers.

49. The method according to claim 43, further comprising effecting relative movement of said mandrel and at least one of said dies along said X axis during or before said rotating.

50. The method according to claim 43, comprising effecting relative movement of said mandrel and at least one of said dies along said Y axis during said rotating.

51. A method of making a filter element comprising spinning fibers from a plurality of dies onto a collector in a coordinate system having X, Y, Z axes orthogonal to each other, said X and Y axes defining an X-Y plane transverse to said Z axis, wherein said collector comprises a rotating mandrel rotating about said Z axis, and comprising spacing at least a first of said dies from said mandrel along said X axis, namely said first die, and spacing at least a second of said dies from said first die along said X-Y plane, namely said second die, said first and second dies being coplanar in the same said X-Y plane and positioned about said Z axis, and varying fiber diameter along the length of the fiber during fiber production by varying distance between said mandrel and said first die by moving said mandrel and said first die relative to one another in said Y axis during or before said rotating, wherein the fibers spun from said first die are filtration fibers forming a first annular filtration zone, and the fibers spun from said second die are filtration fibers forming a second annular filtration zone, spinning said filtration fibers from each of said first and second dies spaced along said X-Y plane directly onto said rotating mandrel, the method further comprising simultaneously spinning fibers from different said dies during a first time increment to form a first annular zone, then varying at least one parameter and simultaneously spinning fibers from said different dies during a second serially sequential time increment to form a second annular zone, said first annular zone comprising first and second subzones, said first subzone having fibers spun from said first die during said first time increment, said second subzone having fibers spun from said second die during said first time increment, said second annular zone having third and fourth subzones, said third subzone having fibers spun from said first die during said second time increment, said fourth subzone having fibers spun from said second die during said second time increment, said first through fourth subzones being radially aligned relative to said Z axis including during said simultaneous spinning during said first time increment and including during said simultaneous spinning during said second time increment, the method further comprising spinning a first set of fibers of a first filter characteristic from said first die, and spinning a second set of fibers of a second different filter characteristic from said second die.

52. The method according to claim 51 wherein said first and second dies are spaced from each other in the X-Y plane by 90°.

53. The method according to claim 51 wherein said first and second dies are spaced from each other in the X-Y plane by 60°.

54. The method according to claim 51 wherein said fibers spun from said first die are polymeric fibers and said fibers spun from said second die are different polymeric fibers.

55. The method according to claim 51 wherein said fibers spun from said first die are polymeric fibers and said fibers spun from said second die are non-polymeric fibers.

56. The method according to claim 51 wherein said fibers spun from said first die are polymeric fibers and said fibers spun from said second die are microglass fibers.

57. The method according to claim 56, wherein the fibers spun from the first die have a fiber diameter within a range of 5-20 microns.

58. The method according to claim 51, further comprising effecting relative movement of said mandrel and at least one of said dies along said X axis during or before said rotating.

59. The method according to claim 51, comprising effecting relative movement of said mandrel and at least one of said dies along said Y axis during said rotating.

* * * * *